Jan. 22, 1963  L. P. F. A. NEUVILLE ET AL  3,074,456
TIRES
Filed April 5, 1960  2 Sheets-Sheet 1
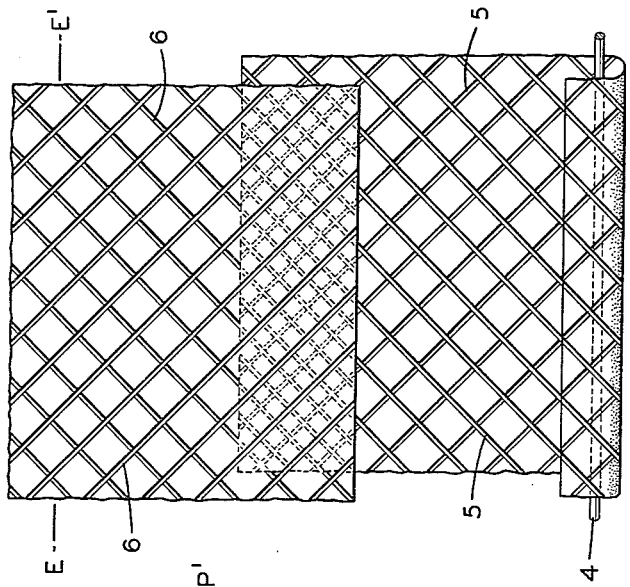
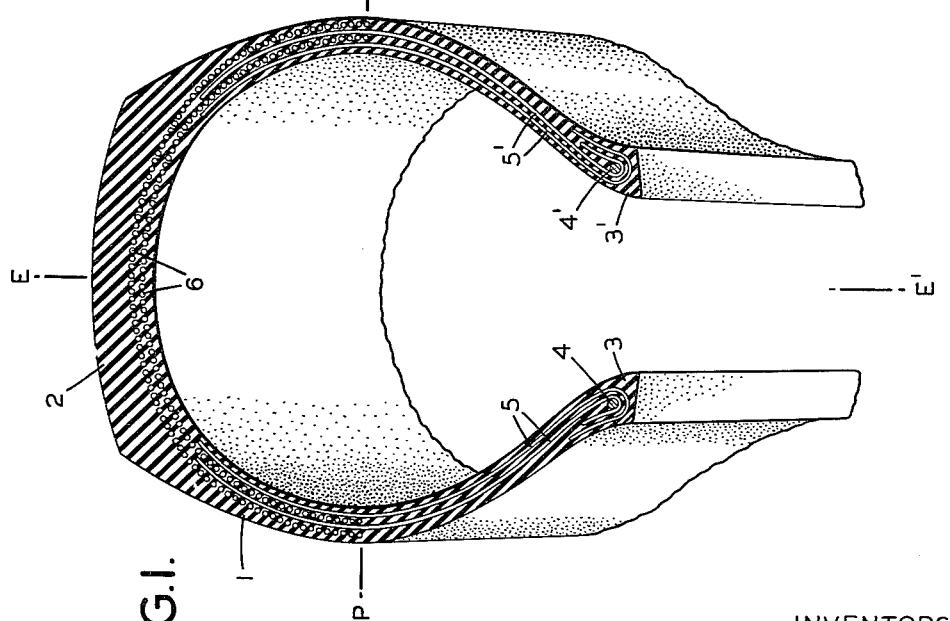
INVENTORS
LOUIS PIERRE FRANCOIS ANDRE NEUVILLE
LOUIS HENRI NOËL SAINT-FRISON
BY
*Burnbaugh, Free, Graves & Donohue*
THEIR ATTORNEYS

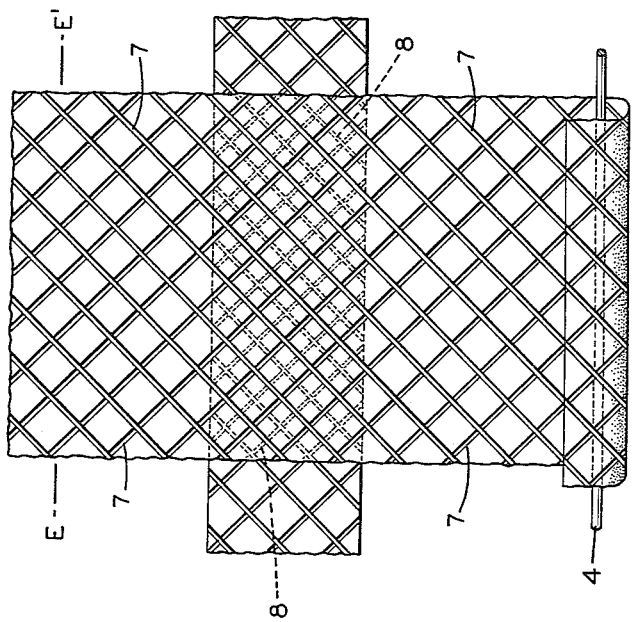
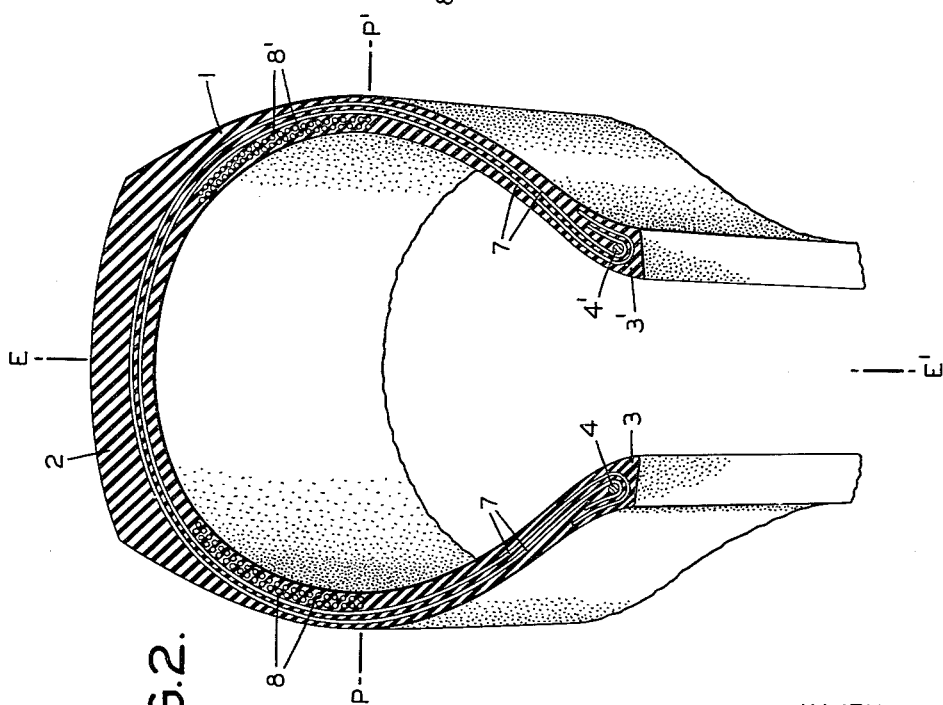
INVENTORS
LOUIS PIERRE FRANCOIS ANDRE NEUVILLE
LOUIS HENRI NOËL SAINT-FRISON
BY
THEIR ATTORNEYS United States Patent Office 3,074,456
Patented Jan. 22, 1963

3,074,456
TIRES
Louis Pierre Francois Andre Neuville and Louis Henri Noel Saint-Frison, Clermont-Ferrand, France, assignors to Michelin & Cie, Clermont-Ferrand, France
Filed Apr. 5, 1960, Ser. No. 20,135
Claims priority, application France Apr. 6, 1959
4 Claims. (Cl. 152—354)

The present invention relates to improvements in tires and, more particularly, to improvements in tire casings for motor vehicles of the crossed casing ply type.

Tire casings are composed of a carcass on which a tread is secured. The cascass has at its edges two beads reinforced by bead wires, or cables. The tread may be reinforced by crown or top plies.

Usually the carcass contains plies for reinforcement, composed, as a rule, of cords or cables in parallel relation to one another in each ply and extending from one bead to the other. These plies are anchored within each bead by being turned back around the tire wire. The cords or cables of one ply may cross the cables of the other.

In the course of road travel, the cords of the plies reinforcing the carcass are subjected to stress which is not uniform along all their length. The area between the edge of the tread and the parallel furthest away from the equatorial plane of the tire is the one in which damage most frequently occurs. This damage is due especially to the great frequency of cyclic flexions in the course of travel, to stones or other obstacles on the road, or else to accidental rubbing of the tire wall against the sidewalk curb. These disadvantages exist above all when the reinforcement of the tire carcass consists of only two crossed plies.

It is a principal object of the present invention to provide a tire with improved qualities, particularly as to road gripping properties, resistance to side wall impact, and in behavior with respect to cyclical flexion.

Another object is to provide a tire with improved reinforcement in its most vulnerable area.

These and other objects of the present invention and advantageous features thereof will become apparent as the description proceeds.

The tire casing according to the present invention is characterized by the fact that its carcass contains a total of three or four crossed reinforcing plies in the upper part of each side wall of the carcass, lying substantially between the edge of the tread and the parallel furthest removed from the equatorial plane of the casing but only two reinforcing plies for the carcass elsewhere.

In one embodiment of the invention, the plies reinforcing the carcass include two lower crossed plies extending from one bead to the edge of the tread zone nearest to this bead and two crossed upper plies extending from one side wall to the other of the carcass between the two parallels located furthest from the equatorial plane of the carcass. Preferably the cords or cables of the lower plies are parallel to those of the upper plies in the area of overlapping.

In another form of the invention, the plies reinforcing the carcass include two principal crossed plies extending from one bead to the other and one or two secondary plies located and extending substantially between one of the said parallels and the corresponding edge of the tread.

The ply or plies for secondary reinforcement may be formed of parallel cords or cables embedded in rubber or some similar plastic material and arranged in the overlapping area parallel to the wires or cords of the principal plies.

For a better understanding of the invention, reference may be had to accompanying drawings in which:

FIGURES 1 and 2 are views in transverse section of a first and second method of carrying out the invention, respectively, and FIGURES 3 and 4 are half views shown in plane of a part of the tire-covering according to the two methods of carrying out the invention shown in FIGURES 1 and 2 respectively.

In all these figures the space between cords and cables has been exaggerated for clearer viewing. In actual practice these wires or cables are very close to one another.

In the examples of the invention described herein, the plies for reinforcement of the carcass may be composed of cords, cables, or strips made of natural, artificial or synthetic textiles, of metal, fiberglass or other materials known up to now and used in the manufacture of tires. These wires, cables or strips are parallel to each other in each ply.

In the example according to FIGURES 1 and 3 the tire casing has a carcass 1 on which a tread 2 is secured and which has two beads 3, 3' reinforced by bead cables or wires 4, 4'. Each side wall of the carcass 1 is reinforced by two lower or sidewall plies 5 extending from the bead to the edge of the tread nearest to this bead. Reinforcement of the carcass is completed by two plies 6 extending from one wall to the other between the two parallels P and P' furthest from the equatorial plane E—E' of the tire, i.e. zone of greatest transverse width of the casing. Between the parallel P or P' and the edge of the tread nearest to the parallel in question, the two plies 5 and 5' and the two plies 6 overlap. This overlapping may be effected alternately, as shown in FIGURE 1, in any order. As a variation, plies 6 may be inside or outside plies 5 and 5' or in between them. In FIGURE 3 it can be seen that the wires, cables or strips of ply 5 are parallel, in the overlapping area, to those of the upper ply 6.

In the example of the invention disclosed in FIGURES 2 and 4, the carcass 1 of the tire casing is reinforced by two main plies 7 extending without interruption from one bead to the other. Two secondary reinforcing plies 8 and 8' are located between each parallel P and P' of the tire and the edge of the tread nearest to the parallel in question. In FIGURE 2, plies 8 and 8' are placed inside the two main plies 7. As a variation, these secondary plies may be placed outside the main plies or between them. FIGURE 4 shows that the wires of secondary plies 8, in the overlap area are arranged parallel to the wires or cables of the principal plies 7.

It is to be understood that the invention is not limited to the methods of carrying it out illustrated and described herein, but that it covers all variations thereof. Thus, for example, outside of the carcass plies, the tire casing may have, in the known way, one or more breaker strips or crown plies in the tread zone.

Inasmuch as many and varied modifications of the subject matter of this invention will become apparent to those skilled in the art from the detailed description given herein, it should be understood that this invention is to be limited only in accordance with the appended claims.

We claim:

1. A tire comprising a carcass having a tread zone at its mid portion and beads at its inner free edges, at least 1 ply extending from each bead and terminating at about the edge of the tread zone nearest said bead and at least 1 additional ply extending from one sidewall to the other through said tread zone and terminating at about the parallels furthest removed from the equatorial plane of the carcass.

2. A tire comprising a carcass having a tread zone at its mid-portion and beads at its inner free edges, at least 2 crossed plies extending from each bead and terminating at about the edge of the tread zone nearest said bead and at least 2 additional crossed plies extending from one sidewall to the other through said tread zone and terminating at about the parallels furthest removed from the equatorial plane of the carcass.

3. A tire comprising a carcass having a tread zone at its mid-portion and beads at its inner free edges, at least 1 ply extending from each bead and terminating at about the edge of the tread zone nearest said bead and at least 2 additional plies extending from one sidewall to the other through said tread zone and terminating at about the parallels furthest removed from the equatorial plane of the carcass.

4. A tire according to claim 2 in which one of the reinforcing elements of the crossed plies extending from each bead and terminating at about the tread zone nearest each bead is substantially parallel in the overlapping zone to one of the reinforcing elements of the crossed plies extending from one sidewall to the other.

References Cited in the file of this patent

UNITED STATES PATENTS

| | | |
|---|---|---|
| 1,350,995 | Grabau | Aug. 24, 1920 |
| 1,818,944 | Darrow | Aug. 11, 1931 |
| 2,348,350 | McKelvey | May 9, 1944 |
| 2,991,818 | Gay et al. | July 11, 1961 |

FOREIGN PATENTS

| | | |
|---|---|---|
| 598,804 | Germany | June 18, 1934 |
| 1,088,973 | France | Sept. 22, 1954 |
| 1,187,693 | France | Mar. 9, 1959 |